United States Patent [19]

Takahashi et al.

[11] Patent Number: 5,380,827
[45] Date of Patent: Jan. 10, 1995

[54] WATER-SOLUBLE MONOAZODYE CONTAINING A TRIAZINYL OR PYRIMIDINYL GROUP AND AT LEAST ONE VINYL SULFONYL TYPE GROUP IN ITS STRUCTURE

[75] Inventors: Yousuke Takahashi; Yukiharu Shimizu; Toshio Hihara, all of Kitakyushu; Kiyoshi Himeno, Munakata, all of Japan

[73] Assignee: Hoechst Mitsubishi Kasei Co., Ltd., Tokyo, Japan

[21] Appl. No.: 49,410

[22] Filed: Apr. 20, 1993

[30] Foreign Application Priority Data

Apr. 20, 1992 [JP] Japan .................. 4-125380
Apr. 28, 1992 [JP] Japan .................. 4-134426
Oct. 23, 1992 [JP] Japan .................. 4-307867

[51] Int. Cl.$^6$ ............... C09B 62/028; C09B 62/085; C09B 62/245; C09B 62/51
[52] U.S. Cl. .................. 534/638; 534/632; 534/642
[58] Field of Search .............. 534/632, 638, 642

[56] References Cited

FOREIGN PATENT DOCUMENTS

| | | |
|---|---|---|
| 0133843 | 3/1985 | European Pat. Off. . |
| 2110325 | 6/1972 | France . |
| 55-163276 | 12/1980 | Japan . |
| 56-91083 | 7/1981 | Japan . |
| 2239024 | 6/1991 | United Kingdom ........ 534/638 |

Primary Examiner—Mary C. Lee
Assistant Examiner—Fiona T. Powers
Attorney, Agent, or Firm—Oblon, Spivak, McClelland, Maier & Neustadt

[57] ABSTRACT

A water-soluble monoazodye having the following formula (I) in its free acid form:

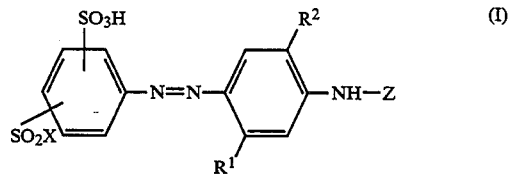

wherein X is —CH=CH$_2$ or —CH$_2$CH$_2$W wherein W is a leaving group removable by alkali; R$^1$ is methyl, —NHCONH$_2$ or —NHCOT$^1$ wherein T$^1$ is methyl, ethyl, —CH$_2$CH$_2$COOH or —CH=CHCOOH; R$^2$ is hydrogen, lower alkyl or lower alkoxy;

and Z is

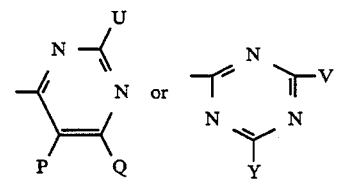

wherein P is cyano or halogen, each of Q and U which are independent of each other, is halogen, V is halogen or

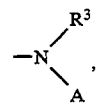

and Y is halogen or a group of the following formula (1) or (2):

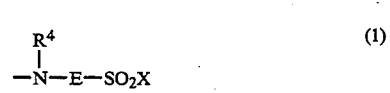

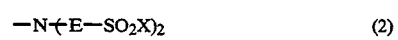

wherein R$^3$, A, R$^4$ and E are as defined in the disclosure and G is as defined above, has a moderate yellow to orange color and is particularly suitable for dyeing cellulose fibers or nitrogen-containing fibers.

12 Claims, No Drawings

WATER-SOLUBLE MONOAZODYE CONTAINING A TRIAZINYL OR PYRIMIDINYL GROUP AND AT LEAST ONE VINYL SULFONYL TYPE GROUP IN ITS STRUCTURE

This present invention relates to a water-soluble monoazodye of a moderate yellow color having a novel chemical structure. Particularly, it relates to a water-soluble monoazodye having from 2 to 4 reactive groups in the chemical structure and being particularly suitable for dyeing cellulose fibers or nitrogen-containing fibers.

It is common to use water-soluble reactive dyes to dye fibers containing cellulose fibers or nitrogencontaining fibers. Such water-soluble reactive dyes are required to be excellent in level dyeing and capable of dyeing the objects in deep color, and yet the dyed products are required to be excellent in various fastnesses. These properties of reactive dyes delicately differ depending upon the basic structures, substituents or reactive groups of the dyes or depending upon the combination thereof. Therefore, dyes having various chemical structures have been proposed.

Japanese Examined Patent Publications No. 18474/1983 and No. 18471/1983 disclose reactive dyes having the following structural formulas (A) and (B), as examples of dyes of moderate yellow type:

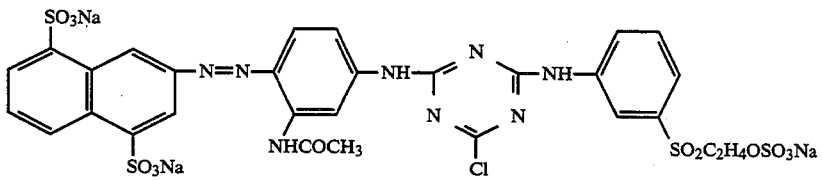
(A)

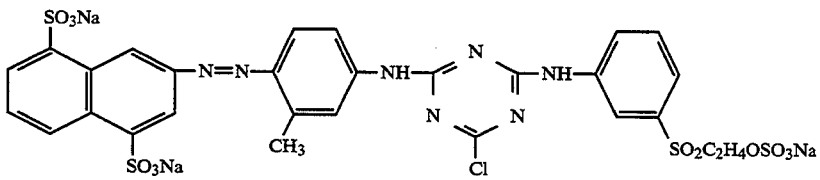
(B)

In each of these reactive dyes, the diazo component is a component of a naphthalene type, but these reactive dyes are still slightly inadequate in the level dyeing property, and they are not fully satisfactory also in the build-up property.

The present invention has been made in view of the above problems, and it is an object of the present invention to provide a water-soluble monoazodye useful as a reactive dye of moderate yellow to orange type which is excellent not only in the chlorine fastness and light fastness but also in the level dyeing property and which is also excellent in the build-up property.

As a result of extensive studies, the present inventors have found it possible to accomplish the above object by using a novel monoazo compound having a specific chemical structure. The present invention has been accomplished on the basis of this discovery.

Thus, the present invention provides a water-soluble monoazodye having the following formula (I) in its free acid form:

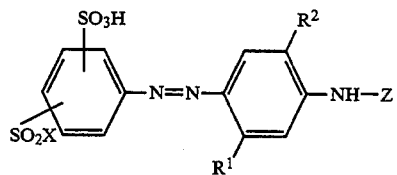
(I)

wherein X is 13 CH=CH$_2$ or —CH$_2$CH$_2$W wherein W is a leaving group removable by alkali; R$^1$ is methyl, —NHCONH$_2$ or —NHCOT$^1$ wherein T$^1$ is methyl, ethyl —CH$_2$CH$_2$COOH or —CH=CHCOOH; R$^2$ is hydrogen, lower alkyl or lower alkoxy; and Z is

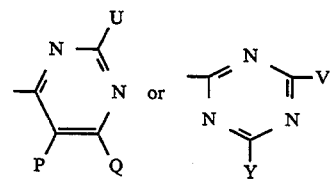

wherein P is cyano or halogen, each of Q and U which are independent of each other, is halogen, V is halogen or

and Y is halogen or a group of the following formula (1) or (2):

(1)

(2)

wherein R$^3$ is hydrogen or lower alkyl, A is a C$_1$-C$_4$ alkyl or naphthalene group substituted by at least one selected from the group consisting of a sulfonic acid group and a carboxylic acid group, or phenyl substituted by at least one selected from the group consisting of a sulfonic acid group and a carboxylic acid group, and which may be substituted by at least one selected from the group consisting of hydroxyl, halogen, C$_1$-C$_2$ alkyl and C$_1$-C$_2$alkoxy, R$^4$ is hydrogen or C$_1$-C$_4$ alkyl, E is phenylene unsubstituted or substituted by lower alkyl, lower alkoxy, halogen or a sulfonic acid group, a naphthalene group unsubstituted or substituted by a sulfonic acid group, $C_1$-$C_4$ alkylene or $C_1$-$C_4$ alkyleneoxy $C_1$-$C_4$ alkylene, and X is as defined above.

In the above water-soluble monoazodye of the present invention, X in the formula (I) represents —CH=CH$_2$ or —CH$_2$CH$_2$W. However, when X is —CH$_2$CH$_2$W, it will be converted to —CH=CH$_2$ by the removal of W-H by alkali. Thus, these two groups may be regarded as equivalent.

The group represented by W which is removable by the action of alkali, may, for example, be a sulfuric acid ester group, a thiosulfuric acid ester group, a phosphoric acid ester group, an acetic acid ester group or a halogen atom. Particularly preferred is a sulfuric acid ester group.

Y in the formula (I) is halogen or a group of the above formula (1) or (2).

When Y is halogen, the halogen includes fluorine, chlorine and bromine. However, when V is halogen, Y is preferably chlorine, and when V is

Y is preferably fluorine.

When Y is the group of the above formula (1), $R^4$ is hydrogen or $C_1$-$C_4$ alkyl, preferably hydrogen, methyl or ethyl.

W in the group Y has the same meaning as the leaving group removable by alkali described above. W in the group X and W in the group Y may be the same or different.

When P, Q or u is halogen, such halogen includes fluorine, chlorine and bromine, preferably chlorine and fluorine.

Specific examples of

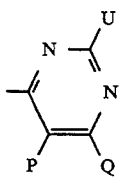

include:

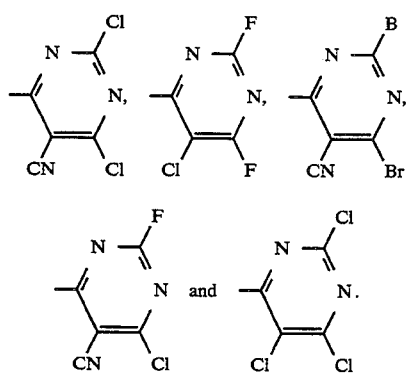

Particularly preferred are:

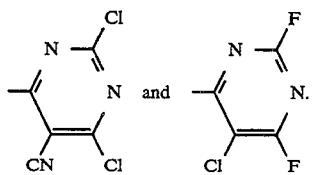

The halogen for V in the formula (I) includes fluorine, chlorine and bromine. However, when Y is halogen, V is preferably chlorine, and when Y is other than halogen, V is preferably chlorine or fluorine.

Specific examples of the group

wherein A is a $C_1$-$C_4$ alkyl or naphthalene group substituted by at least one selected from the group consisting of a sulfonic acid group and a carboxylic acid group, include the following groups:

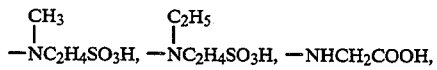

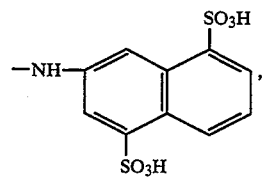

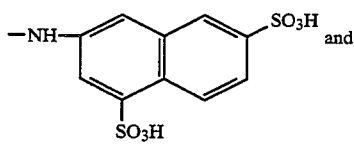

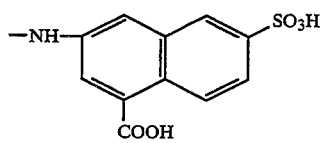

Specific examples of the same group wherein A is phenyl substituted by at least one selected from the group consisting of a sulfonic acid group and a carboxylic acid group, and which may be substituted by at least one selected from the group consisting of hydroxyl, halogen, $C_1$-$C_2$ alkyl and $C_1$-$C_2$ alkoxy, include the following groups:

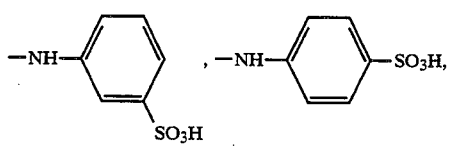

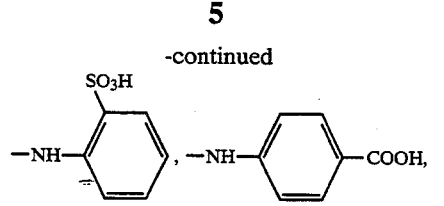, 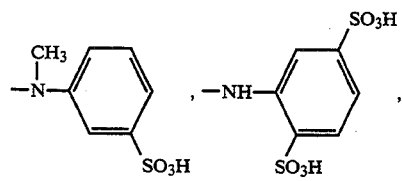,
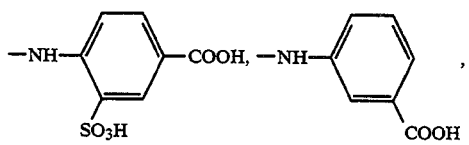,
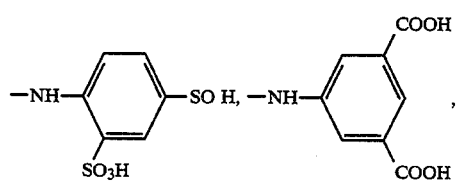,
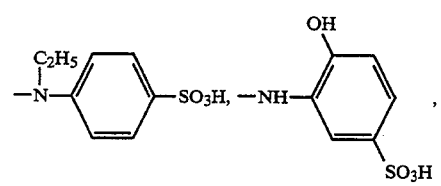,
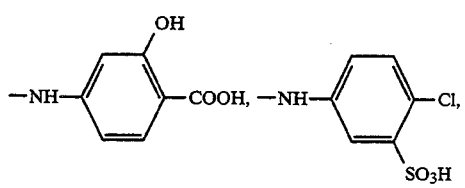,
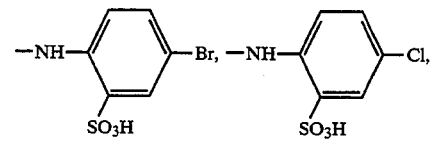,
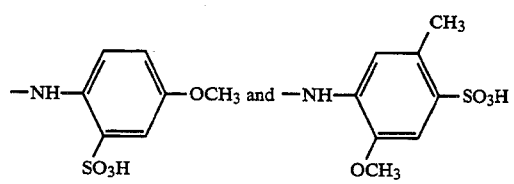
Among them, the following groups are particularly preferred for
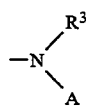
when Y is halogen:
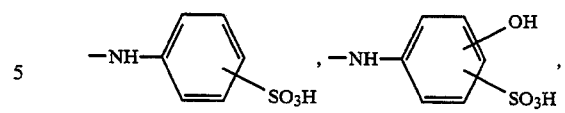,
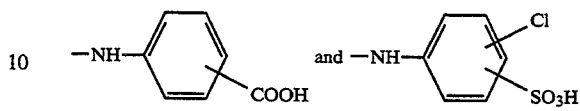
For E, the phenylene unsubstituted or substituted by lower alkyl, lower alkoxy, halogen or a sulfonic acid group and the naphthalene group unsubstituted or substituted by a sulfonic acid group include the following groups:
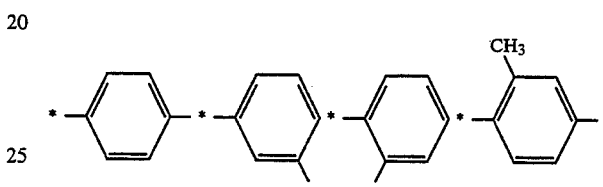
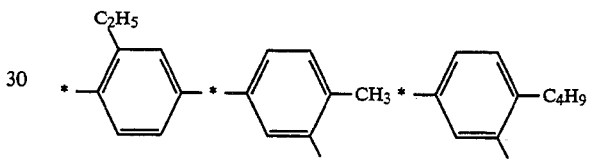
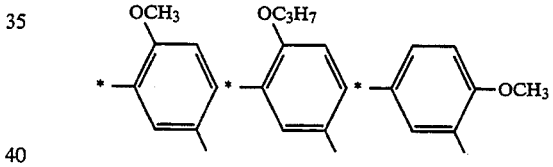
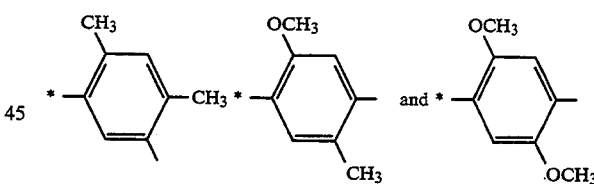
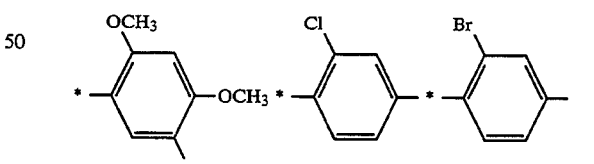
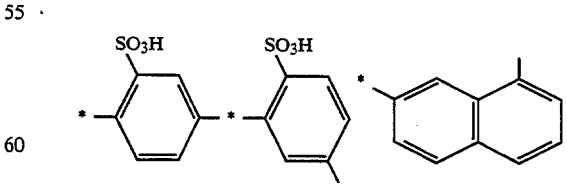
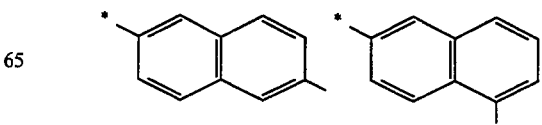

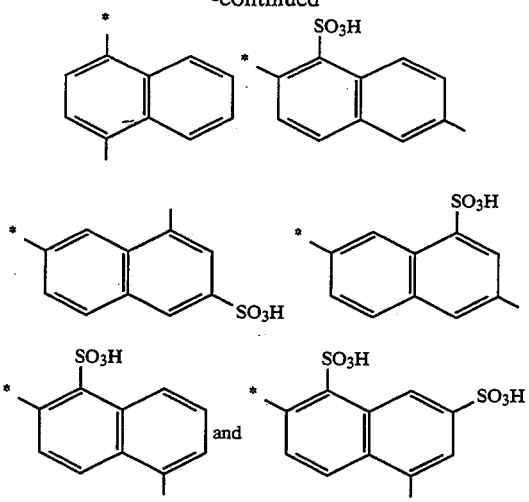

In the above formulas, the bond indicated by * is the bond which is connected to the

group. Further, the $C_1$-$C_4$ alkylene or the $C_1$-$C_4$ alkyleneoxy $C_1$-$C_4$ alkylene for E may, for example, be the following groups:
β-(β-chloroethylsulfonyl)ethyl,
γ-(β-chloroethylsulfonyl)propyl,
δ-(β-chloroethylsulfonyl)butyl,
γ-(β-sulfatoethylsulfonyl)propyl,
β-(vinylsulfonyl)ethyl,
β-[β-(β-chloroethylsulfonyl)ethoxy]ethyl,
γ-[γ-(β-sulfatoethylsulfonyl)propoxy]propyl, and
β-[β-(vinylsulfonyl)ethoxy]ethyl.

When V is halogen,

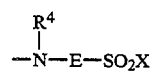

is preferably a group wherein $R^4$ is hydrogen and E is phenylene, $C_1$-$C_4$ alkylene or $C_1$-$C_4$ alkyleneoxy $C_1$-$C_4$ alkylene, such as

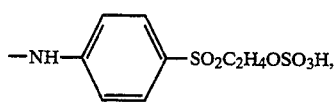

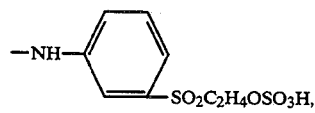

—$NHC_2H_4SO_2C_2H_4OSO_3H$, —$NHC_3H_6SO_2C_2H_4OSO_3H$ or

—$NHC_2H_4OC_2H_4SO_2C_2H_4OSO_3H$.

In the formula (I), $R^1$ is methyl, —$NHCONH_2$ or —$NHCOT^1$ wherein $T^1$ is methyl, ethyl, —$CH_2CH_2COOH$ or —CH=CHCOOH. The monoazodye wherein $R^1$ is —$NHCONH_2$ is particularly excellent in that an object dyed therewith undergoes no color change even against a strong alkaline aqueous solution at the time of the post mercerizing treatment, and that it has no thermotropy.

Further, when Z is

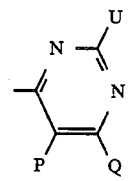

wherein P, Q and U are as defined above

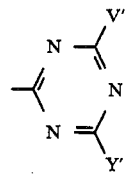

wherein each of V' and Y' is halogen, $R^1$ is preferably —$NHCOCH_2CH_2COOH$ or —$NHCOCH=CH_2COOH$ with a view to improvement of the solubility of the dye.

For $R^2$, the lower alkyl is preferably methyl or ethyl, and the lower alkoxy is preferably methoxy or ethoxy.

For $R^3$, the lower alkyl is usually methyl or ethyl.

In the water-soluble monoazodye of the present invention, —$SO_3H$ and —$SO_2X$ in the diazo component in the above formula (I) may be substituted at any positions of the o-, m- and p-positions. It is preferred that one of them is located at the p-position and the other is located at the o-position.

The water-soluble monoazodye of the present invention may be used in the free acid form or in the form of its salt. The salt may, for example, be an alkali metal salt or an alkaline earth metal salt. Particularly preferred is a lithium salt, a sodium salt or a potassium salt.

The most preferred dyes of the present invention are represented by the following formulas (I-a), (I-b) and (z-c).

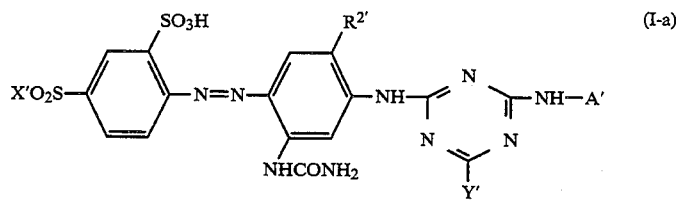

(I-a)

wherein X' and $R^{2'}$ have the same meanings as the above X and $R^2$, respectively, A' is

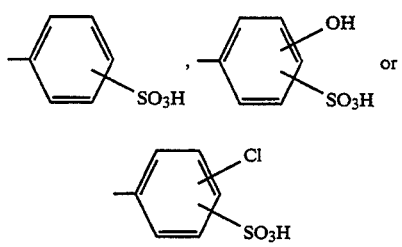

and Y' is fluorine or chlorine.

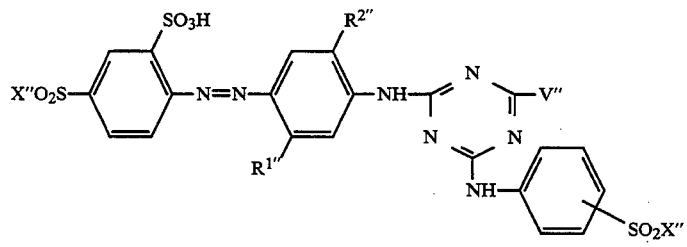

wherein X" and R2" have the same meanings as the above X and R2 respectively, R1" is —NHCH$_2$CH$_2$COOH or —NHCH=CHCOOH, and V" is fluorine or chlorine.

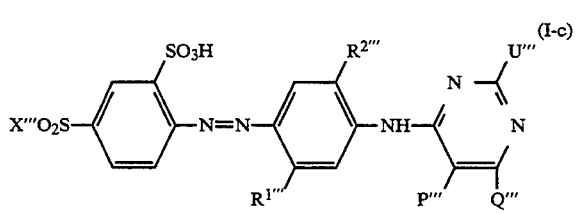

wherein X''' and R2''' have the same meanings as the above X and R2, respectively, R1''' is —NHCH$_2$CH$_2$COOH or —NHCH=CHCOOH, and when P''' is chlorine, each of Q''' and U'''is fluorine, and when P''' is cyano, each of Q''' and Q''' is chlorine.

The water-soluble monoazodye of the present invention can be produced as follows.

Namely, an azo compound of the following formula (II):

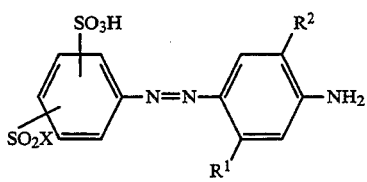

(II)

wherein R$^1$, R$^2$ and X are as defined above, is condensed with a reactive compound of the following formula (III):

Z$^1$—Hal    (III)

wherein Z$^1$ is

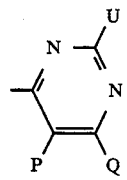

wherein P, Q and U are as defined above or

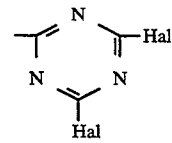

(I-b)

wherein Hal is halogen, and Hal is halogen in an aqueous medium at a temperature of from 0° to 15° C., whereby a water-soluble monoazodye of the following formula (IV):

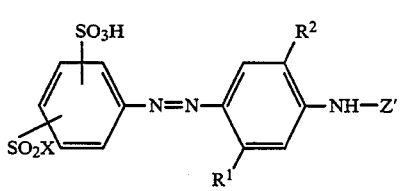

(IV)

wherein R$^1$, R$^2$, X and Z$^1$ are as defined above, is produced.

In a case where Z in the formula (I) is

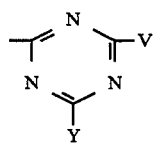

wherein one of V or Y is halogen, an azo compound of the following formula (V):

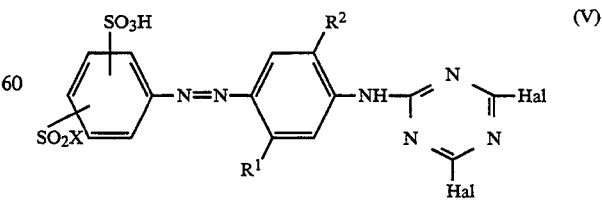

(V)

wherein R$^1$, R$^2$, X and Hal are as defined above, is condensed with an amine of the following formula (VI), (VII) or (VIII):

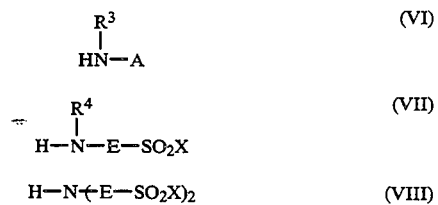

wherein $R^3$, $R^4$, A, E and X are as defined above, in an aqueous medium at a temperature of from 30 to 40° C., whereby a water-soluble monoazodye of the following formula (IX) is obtained:

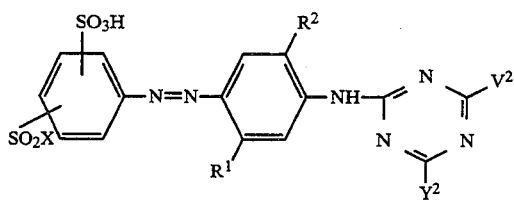

wherein $R^1$, $R^2$ are as defined above, and when $y^2$ is halogen, $V^2$ is

when $y^2$ is the group of the formula (1) or (2), $V^2$ is halogen.

Further, to produce a water-soluble monoazodye of the formula (I) wherein V is

and Y is the group of the formula (1) or (2), a monoazodye of the following formula (X):

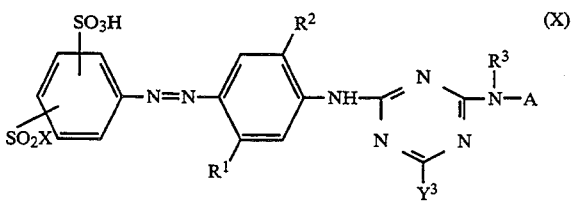

wherein $R^1$, $R^2$, $R^3$, A and X are as defined above, and $y^3$ is halogen, is condensed with an amino compound of the above formula (VII) or (VIII) in an aqueous medium at a temperature of from 85° to 95° C. at a pH of from 4 to 6.

The feature in the chemical structure of the water-soluble monoazodye of the present invention resides in that the diazo component has a phenyl group substituted by —$SO_3H$ and —$SO_2X$ and the coupling component has a halotriazinyl group, a pyrimidinyl group or a triazinyl group substituted by the group of the formula (1) or (2). By virtue of this characteristic chemical structure, the build-up property and the level dyeing property at the time of dyeing are remarkably improved.

The water-soluble monoazodye of the present invention can be widely used as a dyestuff for dyeing fibers and cloths, a colorant for tinting paper and synthetic resins and as a colorant for e.g. an ink for an ink jet printer. However, it is particularly suitable for use as a dyestuff.

When the water-soluble monoazodye of the present invention is to be used as a dyestuff, the fibers to be dyed may, for example, be cellulose fibers such as cotton, viscose rayon, cupra ammonium rayon or kemp, or nitrogen-containing fibers such as polyamide, wool or silk. Particularly preferred are cellulose fibers. Such fibers may be used in the form of mixed fibers with e.g. polyester, triacetate or polyacrylonitrile.

To dye cellulose fibers or nitrogen-containing fibers by means of the water-soluble monoazodye of the present invention, it is common to employ an acid-binding agent, for example, an inorganic alkali such as sodium hydrogencarbonate or sodium carbonate, or an organic base such as triethylamine. The dyeing can be conducted in the presence of such an acid-binding agent in accordance with a conventional method.

The water-soluble monoazodye of the present invention may be used in combination with the other water-soluble dye.

As the dyeing method, a dipping method is particularly preferred, and the dyeing temperature is usually from 40° to 80° C.

Further, the water-soluble monoazodye of the present invention can be applied also to other dyeing method such as a cold pad batch method, a pad steam method, or a textile printing method.

The water-soluble monoazodye of the formula (I) of the present invention is particularly suitable for dyeing cellulose fibers or nitrogen-containing fibers to a yellow to orange color, and it is excellent in the buildup property. Further, the dyed products are excellent not only in the chlorine-fastness and the light-fastness but also in the level dyeing property.

Now, the present invention will be described in further detail with reference to Examples. However, it should be understood that the present invention is by no means restricted to such specific Examples.

EXAMPLE 1 and COMPARATIVE EXAMPLE 1

0.3 g or 1.2 g of each of monoazodyes of the following formulas (I-1) and (C):

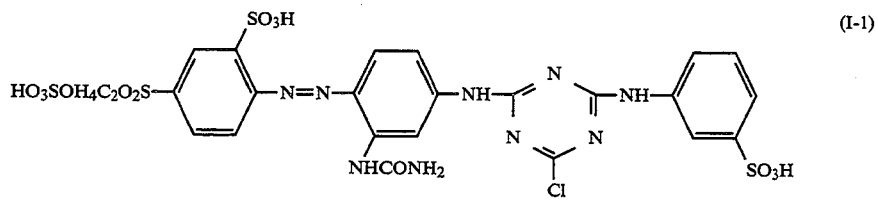

-continued

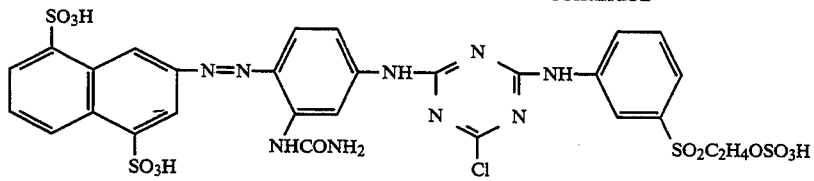
(C)

was dissolved in 300 ml of water, and 20 9 of Glauber's salt was added thereto to obtain a dye bath. In this dye bath, 15 9 of a non-mercerized cotton cloth was dipped, and the temperature was raised to 60° C. over a period of 30 minutes. Then, 4.5 9 of sodium carbonate was added thereto, and dyeing was conducted at 60° C. for one hour, followed by washing with water, soaping, washing with water and drying to obtain a yellow dyed cloth.

Here, the monoazodye of the above formula (I-1) was prepared by reacting 1 mol of a monoazo compound of the following formula (II-1):

TABLE 1

| | Monoazodye | Build-up property (1.2 g/0.3 g) | Level dyeing property |
|---|---|---|---|
| Example 1 | (I-1) | 250 | Remarkably uniformly dyed |
| Comparative Example 1 | (C) | 150 | Non-uniformity in the dyed density observed |

EXAMPLE 2

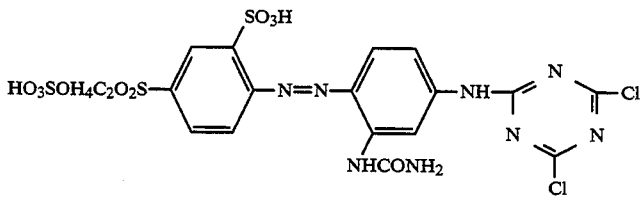
(II-1)

with 1 mol of 3-sulfoaniline in an aqueous medium at 35° C. for 4 hours while maintaining the pH at a level of from 5.0 to 5.5, followed by salting out with potassium chloride. [max: 404 nm (water)]

Measurement of the build-up property

With respect to each dyed cloth, its surface reflectance was measured by a color difference meter (Macbeth ® spectrometer MS-2020, manufactured by a division of Kolmorgen Corporation) to obtain a percentage exhaustion. The build-up property was represented by a relative value of the dyed density obtained by using 1.2 g of the dye to the dyed density obtained by using 0.3 g of the dye.

Level dyeing property

With respect to the dyed cloth obtained by using 0.3 g of each monoazodye, the uniformity in dyeing was visually evaluated.

The results are shown in Table 1.

0.3 g or 0.6 g of a monoazodye [max: 412 nm (water)] of the following formula (I-2):

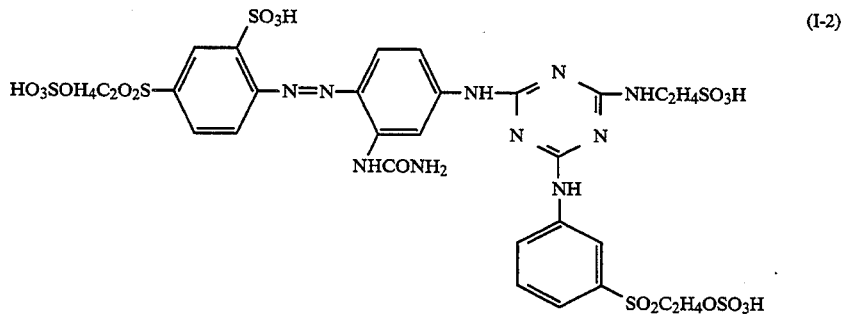
(I-2)

was dissolved in 300 ml of water, and 20 g of Glauber's salt was added thereto to obtain a dye bath. In this dye bath, 15 g of a cotton cloth was dipped, and the temperature was raised to 60° C. over a period of 30 minutes. Then, 4.5 g of sodium carbonate was added thereto, and dyeing was conducted at 60° C. for one hour, followed by washing with water, soaping, washing with water and drying to obtain a yellow dyed product having a good level dyeing property. Further, the build-up property was also good.

Here, the monoazodye of the above formula (I-2) was prepared as follows.

Namely, 1 mol of a monoazodye of the above formula (II-1) was reacted with 1 mol of 2-aminoethane sulfonic acid in an aqueous medium at a temperature of from 30 to 40° C. under stirring for 10 hours while maintaining the pH at a level of 8 with sodium carbonate to obtain a compound of the following formula:

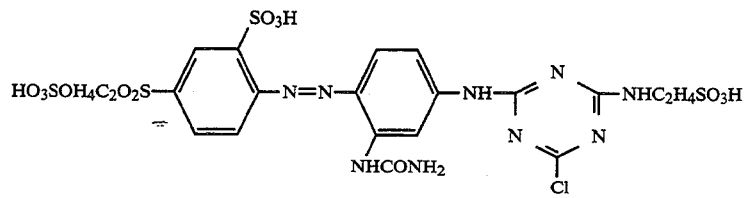

Then, this compound was reacted with 1.2 mol of 3-(βhydroxyethyl)sulfonylaniline sulfuric acid ester in an aqueous medium at a temperature of from 90 to 95° C. under stirring for 10 hours while maintaining the pH at a level of from 5 to 6 with sodium acetate, followed by salting out with potassium chloride to obtain the monoazodye of the above formula (I-2).

EXAMPLE 3

The monoazodyes shown in the following Tables 2 and 3 (in their free acid forms) were prepared in accordance with the method of Example 1 or 2, and cotton cloths were dyed with them in the same manner as in Example 1, whereby their level dyeing properties were excellent, and their build-up properties were also excellent.

TABLE 2
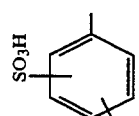
| No. | XO₂S-[ring]-SO₃H | —R¹ | —R² | —Y | —V | λmax nm (Water) | Color of dyed cloth |
|---|---|---|---|---|---|---|---|
| 3-1 | HO₃SOH₄C₂O₂S-[ring]-SO₃H | —NHCONH₂ | —H | —F | —NH-[phenyl]-SO₃H | 405 | Yellow |
| 3-2 | HO₃SOH₄C₂O₂S-[ring]-SO₃H | —NHCONH₂ | —H | —Cl | —NH-[phenyl]-COOH | 405 | Yellow |
| 3-3 | HO₃SOH₄C₂O₂S-[ring]-SO₃H | —NHCONH₂ | —H | —Cl | —NH-[phenyl(COOH)]-SO₃H | 405 | Yellow |
| 3-4 | HO₃SOH₄C₂O₂S-[ring]-SO₃H | —NHCONH₂ | —H | —F | —NHC₂H₄SO₃H | 408 | Yellow |

TABLE 2-continued

Structure (I):

A benzene ring bearing SO$_3$H and SO$_2$X substituents, connected via —N=N— to another benzene ring bearing R$^1$ and R$^2$ substituents, with —NH— linked to a triazine ring substituted with Y and V.

| No. | (aryl-SO$_3$H, SO$_2$X) | —R$^1$ | —R$^2$ | —Y | —V | λmax nm (Water) | Color of dyed cloth |
|---|---|---|---|---|---|---|---|
| 3-5 | 2-SO$_3$H, 4-SO$_2$C$_2$H$_4$OSO$_3$H phenyl | —NHCONH$_2$ | —H | 3-(SO$_2$C$_2$H$_4$OSO$_3$H)phenyl-NH— | 2-SO$_3$H, 5-SO$_3$H, 4-NH– phenyl | 413 | Yellow |
| 3-6 | 2-SO$_3$H, 4-SO$_2$C$_2$H$_4$OSO$_3$H phenyl | —NHCONH$_2$ | —H | 4-(SO$_2$C$_2$H$_4$OSO$_3$H)phenyl-N(CH$_3$)— | —NHC$_3$H$_6$SO$_3$H | 415 | Yellow |
| 3-7 | 2-SO$_3$H, 4-SO$_2$C$_2$H$_4$OSO$_3$H phenyl | —NHCONH$_2$ | —H | —Cl | —NHCHCH$_2$COOH (with COOH) | 408 | Yellow |
| 3-8 | 2-SO$_3$H, 4-SO$_2$C$_2$H$_4$OSO$_3$H phenyl | —NHCOCH$_2$ | —CH$_3$ | —F | —N(CH$_3$)C$_2$H$_4$COOH | 410 | Yellow |

TABLE 2-continued

Structure (I):

$$\text{(SO}_3\text{H, XO}_2\text{S)-Ph-N=N-Ph(R}^2\text{)(R}^1\text{)-NH-[triazine with V, Y]}$$

| No. | [XO₂S-Ph-SO₃H] | —R¹ | —R² | —Y | —V | λmax nm (Water) | Color of dyed cloth |
|---|---|---|---|---|---|---|---|
| 3-9 | H₂C=HCO₂S—C₆H₃—SO₃H | —NHCONH₂ | —OCH₃ | —Cl | 3-SO₃H-phenyl with N(CH₃)— | 432 | Orange |
| 3-10 | HO₃SOH₄C₂O₂S—C₆H₃—SO₃H | —NHCOC₂H₅ | —OCH₃ | —F | 3,5-(COOH)₂-phenyl-NH— | 428 | Yellow |
| 3-11 | HO₃SOH₄C₂O₂S—C₆H₃—SO₃H | —NHCONH₂ | —H | —Cl | 3-SO₃H-phenyl-NH— | 403 | Yellow |
| 3-12 | HO₃SOH₄C₂O₂S—C₆H₃—SO₃H | —NHCONH₂ | —H | —F | 2-SO₃H-phenyl-NH— | 403 | Yellow |

TABLE 2-continued

Structure (I):

A benzene ring with SO₃H and SO₂X substituents, connected via N=N to a benzene ring bearing R¹ and R², which is linked through NH to a triazine ring with substituents V and Y.

| No. | XO₂S—(SO₃H)— | —R¹ | —R² | —Y | —V | λmax nm (Water) | Color of dyed cloth |
|---|---|---|---|---|---|---|---|
| 3-13 | 2-methyl-5-SO₃H phenyl with ClH₄C₂O₂S | —NHCONH₂ | —OCH₃ | 3-(N-C₂H₅, N-C₂H₄SO₂CH=CH₂)phenyl | —N(CH₃)C₂H₄SO₃H | 430 | Orange |
| 3-14 | 2-methyl-5-SO₂C₂H₄OSO₃H phenyl with HO₃S | —NHCONH₂ | —H | —F | 3-SO₃H-phenyl-NH— | 407 | Yellow |
| 3-15 | 2-methyl-5-SO₃H phenyl with H₃CCOH₄C₂O₂S | —NHCONH₂ | —H | —Cl | 4-SO₃H-3-COOH-phenyl-NH— | 405 | Yellow |
| 3-16 | 2-methyl-5-SO₃H phenyl with HO₃SOH₄C₂O₂S | —NHCONH₂ | —H | —Cl | 2-OH-5-SO₃H-phenyl-NH— | 403 | Yellow |

TABLE 2-continued $$\text{structure (I)}$$

| No. | (SO₃H/XO₂S aryl) | —R¹ | —R² | —Y | —V | λmax nm (Water) | Color of dyed cloth |
|---|---|---|---|---|---|---|---|
| 3-17 | HO₃SOH₄C₂O₂S— / —SO₃H (tolyl) | —NHCONH₂ | —H | —Cl | —NH—C₆H₃(Cl)(SO₃H) | 402 | Yellow |
| 3-18 | HO₃SOH₄C₂O₂S— / —SO₃H (tolyl) | —NHCONH₂ | —H | —F | —NH—C₆H₃(Br)(SO₃H) | 402 | Yellow |
| 3-19 | HO₃SOH₄C₂O₂S— / —SO₃H (tolyl) | —CH₃ | —H | —Cl | —NH—C₆H₃(OCH₃)(SO₃H) | 391 | Yellow |
| 3-20 | HO₃SOH₄C₂O₂S— / —SO₃H (tolyl) | —CH₃ | —OCH₃ | —F | —NH—C₆H₂(CH₃)(SO₃H)(OCH₃) | 418 | Yellow |

TABLE 2-continued

Structure (I):

SO₃H-/SO₂X substituted phenyl—N=N—[phenyl with R¹, R²]—NH—[triazine with V, Y]

| No. | XO₂S-[phenyl]-SO₃H | —R¹ | —R² | —Y | —V | λmax nm (Water) | Color of dyed cloth |
|---|---|---|---|---|---|---|---|
| 3-21 | HO₃SOH₄C₂O₂S-[phenyl]-SO₃H | —NHCONH₂ | —H | —Cl | m-(C₂H₅)NH-C₆H₄-SO₃H | 403 | Yellow |
| 3-22 | HO₃SOH₄C₂O₂S-[phenyl]-SO₃H | —NHCONH₂ | —H | —Cl | 2-NH-naphthalene-5,8-(SO₃H)₂ | 403 | Yellow |
| 3-23 | HO₃SOH₄C₂O₂S-[phenyl]-SO₃H | —NHCONH₂ | —H | —F | 3-NH-naphthalene-6-SO₃H, 1-COOH | 403 | Yellow |
| 3-24 | HO₃SOH₄C₂O₂S-[phenyl]-SO₃H | —NHCONH₂ | —H | —NHC₂H₄SO₂C₂H₄Cl | m-NH-C₆H₄-SO₃H | 417 | Yellow |

TABLE 2-continued

Structure (I):

Ar–N=N–C6H2(R2)(R1)–NH–[triazine with V, Y]

where Ar = phenyl with SO3H and SO2X substituents.

| No. | Ar (SO3H, SO2X phenyl) | –R1 | –R2 | –Y | –V | λmax nm (Water) | Color of dyed cloth |
|---|---|---|---|---|---|---|---|
| 3-25 | HO3SOH4C2O2S–C6H3–SO3H | –NHCOCH2CH2COOH | –OCH3 | –Cl | –Cl | 420 | Yellow |
| 3-26 | HO3SOH4C2O2S–C6H3–SO3H | –NHCOCH=CHCOOH | H | –NHC2H4OC2H4SO2C2H4OSO3H | –F | 409 | Yellow |
| 3-27 | HO3SOH4C2O2S–C6H3–SO3H | –NHCONH2 | H | –NHC3H6SO2C2H4OSO3H | 2-OH, 5-SO3H phenyl with –NH– | 419 | Yellow |
| 3-28 | HO3SOH4C2O2S–C6H3–SO3H | –NHCOCH3 | –OC2H5 | 4-(SO2C2H4OSO3H) phenyl with –NH– | –Cl | 429 | Orange |

TABLE 2-continued

Structure (I):

HO₃S-C₆H₃(-SO₂X)-N=N-C₆H₂(R¹)(R²)-NH-[triazine with N=V and N=Y substituents]

| No. | XO₂S–C₆H₃–SO₃H | –R¹ | –R² | –Y | –V | λmax nm (Water) | Color of dyed cloth |
|---|---|---|---|---|---|---|---|
| 3-29 | HO₃SOH₄C₂O₂S–C₆H₃–SO₃H | –NHCONH₂ | –H | 8-amino-naphthalene-2-SO₃H with 6-SO₂C₂H₄OSO₃H | –Cl | 407 | Yellow |
| 3-30 | HO₃SOH₄C₂O₂S–C₆H₃–SO₃H | –NHCONH₂ | –H | 2-(N-C₂H₅)amino-naphthalene-1-SO₃H with 6-SO₂C₂H₄OSO₃H | –F | 413 | Yellow |
| 3-31 | HO₃SOH₄C₂O₂S–C₆H₃–SO₃H | –NHCONH₂ | –H | –N(C₃H₇)–C₂H₄SO₂C₂H₄Cl | –NHC₂H₄SO₃H | 414 | Yellow |
| 3-32 | HO₃SOH₄C₂O₂S–C₆H₃–SO₃H | –NHCONH₂ | –H | 4-(NH–)-3-Cl–C₆H₃–SO₂C₂H₄OSO₃H | –NH–C₆H₄–SO₃H (meta) | 412 | Yellow |

TABLE 2-continued
| No. | | $R^1$ | $R^2$ | $-Y$ | $-V$ | λmax nm (Water) | Color of dyed cloth |
|---|---|---|---|---|---|---|---|
| 3-33 | 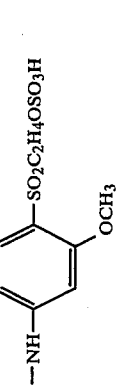 | $-NHCONH_2$ | $-H$ |  |  | 414 | Yellow |
| 3-34 | 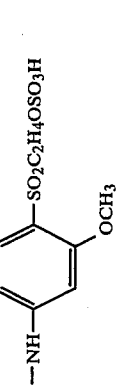 | $-NHCOCH_2-CH_2COOH$ | $-CH_3$ | $-NH\begin{matrix}C_2H_4SO_2C_2H_4OSO_3H\\C_2H_4SO_2C_2H_4OSO_3H\end{matrix}$ | $-Cl$ | 411 | Yellow |
| 3-35 | 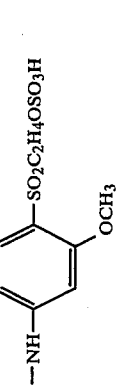 | $-CH_3$ | H | $-NH\begin{matrix}C_2H_4SO_2C_2H_4Br\\C_2H_4SO_2C_2H_4Br\end{matrix}$ | 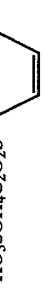 | 433 | Orange |
| 3-36 | 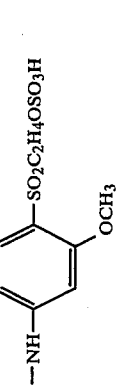 | $-NHCOCH_3$ | $OCH_3$ | $-NHC_2H_4SO_2CH=CH_2$ | 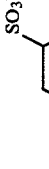 | 432 | Orange |
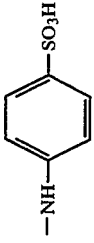

TABLE 2-continued

Structure (I):

Ar(SO₃H)(SO₂X)—N=N—[phenyl with R², R¹]—NH—[triazine with V, Y]

| No. | XO₂S-Ar-SO₃H | —R¹ | —R² | —Y | —V | λmax nm (Water) | Color of dyed cloth |
|---|---|---|---|---|---|---|---|
| 3-37 | HO₃SOH₄C₂O₂S—⟨benzene, SO₃H⟩ | —NHCONH₂ | H | —NH—⟨phenyl, SO₃H, SO₂C₂H₄OSO₃H⟩ | —Cl | 402 | Yellow |
| 3-38 | HO₃SOH₄C₂O₂S—⟨benzene, SO₃H⟩ | —NHCOCH₂—CH₂COOH | OCH₃ | Cl | Cl | 413 | Yellow |
| 3-39 | HO₃SOH₄C₂O₂S—⟨benzene, SO₃H⟩ | —NHCOCH₂—CH₂COOH | —OCH₃ | —NH—⟨phenyl, SO₂C₂H₄OSO₃H⟩ | —F | 426 | Orange |
| 3-40 | HO₃SOH₄C₂O₂S—⟨benzene, SO₃H⟩ | —NHCOCH=CHCOOH | —OCH₃ | —NH—⟨phenyl, SO₂C₂H₄OSO₃H⟩ | —NH—⟨phenyl, COOH⟩ | 434 | Orange |

TABLE 2-continued

Structure (I):

A phenyl ring bearing SO₃H and SO₂X substituents — N=N — phenyl ring bearing R¹ and R² — NH — triazine ring with -V and -Y substituents

| No. | XO₂S–(SO₃H)–phenyl | -R¹ | -R² | -Y | -V | λmax nm (Water) | Color of dyed cloth |
|---|---|---|---|---|---|---|---|
| 3-41 | HO₃SOH₄C₂O₂S–(SO₃H)–tolyl | -NHCOCH=CHCOOH | -OCH₃ | -NH-phenyl-SO₂C₂H₄OSO₃H | -F | 425 | Orange |
| 3-42 | HO₃SOH₄C₂O₂S–(SO₃H)–tolyl | -NHCOCH₃ | -OCH₃ | -NHC₂H₄OC₂H₄SO₂C₂H₄OSO₃H | -F | 423 | Orange |

TABLE 3

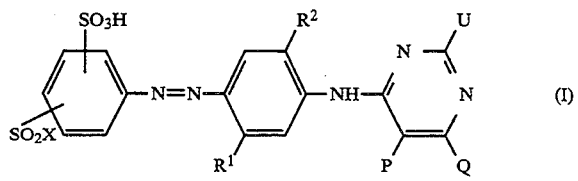

| No. | XO₂S | —R¹ | —R² | —P | —Q | —U | λmax nm (water) | Color of dyed cloth |
|---|---|---|---|---|---|---|---|---|
| 3-43 |  | —NHCOCH=CHCOOH | —OC₂H₅ | —Cl | —F | —F | 422 | Yellow |
| 3-44 |  | —NHCOCH₂—CH₂COOH | —OC₂H₅ | —CN | Cl | —Cl | 423 | Yellow |
| 3-45 | 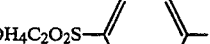 | —NHCOCH₂—CH₂COOH | —OCH₃ | —Cl | —F | —F | 420 | Yellow |
| 3-46 | 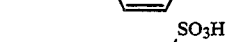 | —NHCOCH=CHCOOH | —OCH₃ | —Cl | —Cl | —Cl | 421 | Yellow |

What is claimed is:

1. A water-soluble monoazo dye having the following formula (I) in its free acid form:

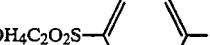

wherein X is —CH=CH₂ or —CH₂CH₂W wherein W is a leaving group removable by alkali, R¹ is methyl, —NHCONH₂, or —NHCOT¹ wherein T¹ is methyl, ethyl, —CH₂CH₂COOH or —CH=CHCOOH; R² is hydrogen, lower alkyl or lower alkoxy; and Z is 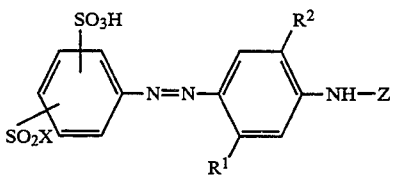

wherein V is halogen or

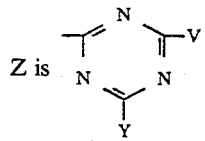

and Y is halogen or a group of the following formula (1) or (2):

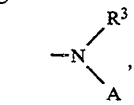

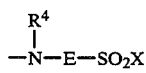

wherein R³ is hydrogen or lower alkyl, A is a C₁-C₄ alkyl or naphthalene group substituted by at least one selected from the group consisting of a sulfonic acid group and a carboxylic acid group, or phenyl substituted by at least one selected from the group consisting of a sulfonic acid group and a carboxylic acid group, and which may be substituted by at least one selected from the group consisting of hydroxyl, halogen, C₁-C₂ alkyl and C₁-C₂ alkoxy, R⁴ is hydrogen or C₁-C₄ alkyl, E is phenylene unsubstituted or substituted by lower alkyl, lower alkoxy, halogen or a sulfonic acid group, a naphthalene group unsubstituted or substituted by a sulfonic acid group, C₁-C₄ alkylene or C₁-C₄ alkyleneoxy C₁-C₄ alkylene, and X is as defined above.

2. A water-soluble monoazo dye having the following formula (I) in its free acid form:

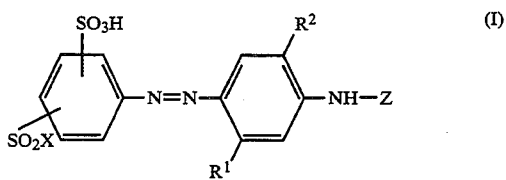

wherein X is —CH=CH₂ or —CH₂CH₂W wherein W is a leaving group removable by alkali; R¹ is —NHCOT¹ wherein T¹ is —CH₂CH₂COOH or —CH=CH- COOH; $R^2$ is hydrogen, lower alkyl or lower alkoxy; and Z is

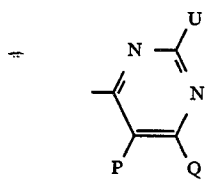

wherein P is cyano or halogen, each of Q and U which are independent of each other, is halogen.

3. The monoazo dye according to claim 1, wherein V is

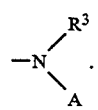

4. The monoazo dye according to claim 1, wherein V is

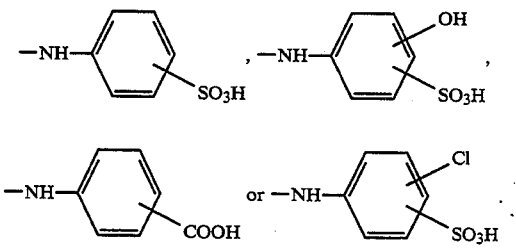

5. The monoazo dye according to claim 1, wherein Y is fluorine or chlorine, and V is

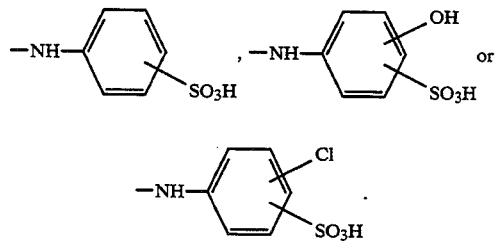

6. The monoazo dye according to claim 1, wherein $R^1$ is —NHCONH$_2$.

7. The monoazo dye according to claim 1, wherein Y is $$-\overset{R^4}{\underset{|}{N}}-E-SO_2X \text{ or } -N(-E-SO_2X)_2.$$

8. The monoazo dye according to claim 7, wherein E is

[benzene ring], —C$_2$H$_4$—, —C$_3$H$_6$— or —C$_2$H$_4$OC$_2$H$_4$—.

9. The monoazo dye according to claim 1, wherein Y is

—NH—[benzene ring]—SO$_2$X.

10. The monoazo dye according to claim 1, wherein Y is

—NH—[benzene ring]—SO$_2$X, and V is fluorine or chlorine.

11. The monoazo dye according to claim 1, wherein Y is

—NH—[benzene ring]—SO$_2$X,

V is fluorine or chlorine, and $R^1$ is —NHCOCH$_3$, —NHCOCH$_2$CH$_2$COOH or —NHCOCH=CH—COOH.

12. The monoazo dye according to claim 11, wherein $R^1$ is —NHCOCH$_2$CH$_2$COOH or —NHCOCH=CH—COOH.

* * * * *